United States Patent

[11] 3,568,023

| [72] | Inventor | Albert G. Conrad |
| | | 4591 Caminode Mieasol, Santa Barbara, Calif. 93105 |
| [21] | Appl. No. | 864,013 |
| [22] | Filed | Oct. 6, 1969 |
| [45] | Patented | Mar. 2, 1971 |

[54] TUNED CIRCUIT MOTOR SYSTEM
7 Claims, 1 Drawing Fig.

[52] U.S. Cl. ............................................ 318/244, 318/250
[51] Int. Cl. .............................................. H02p 7/36
[50] Field of Search ................................. 318/220, 221, 244, 245, 249, 250

[56] References Cited
UNITED STATES PATENTS

| 1,580,457 | 4/1926 | Todd | 318/245X |
| 1,845,173 | 2/1932 | Nyman | 318/244 |
| 1,920,803 | 8/1933 | Nagashev | 318/244 |
| 2,192,050 | 2/1940 | Norcross | 318/244 |
| 2,278,621 | 4/1942 | Norcross | 318/244X |
| 2,379,867 | 7/1945 | Conrad | 318/245 |
| 3,295,035 | 12/1966 | Field | 318/245 |

Primary Examiner—Oris L. Rader
Assistant Examiner—Gene Z. Rubinson
Attorney—Harry W. Brelsford ABSTRACT: A single-phase alternating-current motor system is provided wherein the motor components form part of a control system that provides for predetermined standstill torque and for running torques of slightly less but of the same order of magnitude as the starting torque. The standstill torque is adjustable. No starting devices are necessary. The efficiency and the power factor are high. This is accomplished by use of a monocyclic network that supplies the armature circuit. The field windings are used in dual function, (a) they provide the field flux that results in torque production, (b) they serve as reactor components of the tuned, monocyclic network that controls the current in the armature circuit.

PATENTED MAR 2 1971  3,568,023

INVENTOR.
ALBERT G. CONRAD

BY H.W. Brelsford

ATTORNEY

TUNED CIRCUIT MOTOR SYSTEM

This invention relates to single-phase alternating-current motors and has particular reference to an electrical system that produces a motor torque that caries only slightly over its speed range.

One objective of this new system is to provide a motor drive that will permit large changes of speed with only small changes of speed with only small changes of torque, thus permitting the motor to adjust its speed in accordance with the speed demands of the load.

Another objective is to provide a means whereby the torque can be adjusted and thus alter the magnitude of the torque can be adjusted and thus alter the magnitude of the torque without changing the nature of the speed-torque characteristics of the machine.

Another object is to provide the above characteristics without the use of electronic control systems or feedback devices.

Another object is to provide a drive with the above characteristics without the use of resistors which necessarily waste energy.

Another object of the invention is to provide a motor having a torque that is unidirectional for both positive and negative speeds and when operating with negative speeds (driven backward) it acts as a brake on the load by feeding energy back to the supply system.

Other objects, advantages, and features of the invention will be apparent in the following description considered together with the attached drawings forming an integral part of this disclosure and illustrative of presently preferred embodiments of the invention and in which:

FIG. 1 is a schematic diagram showing a system in which the field windings of the motor are connected in a monocyclic network. Two condensers are also used to provide two tuned circuits. The reactance of each condenser is adjusted to make its ohmic value equal to that of the field winding sections installed on the motor stator. Each of the tuned circuits is connected to the supply voltage source. The junctions between the field sections and the capacitors are connected to the armature circuit.

Figure 1:
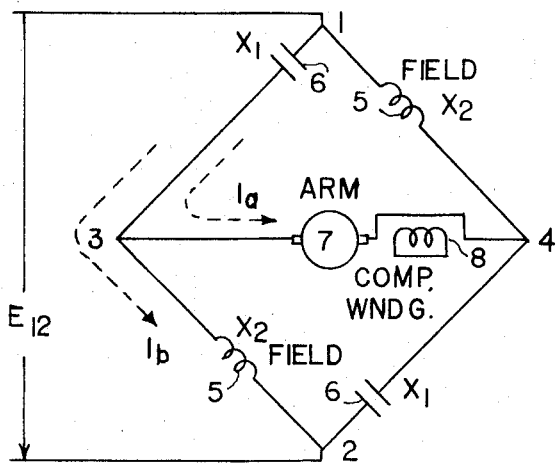
Figure 5:
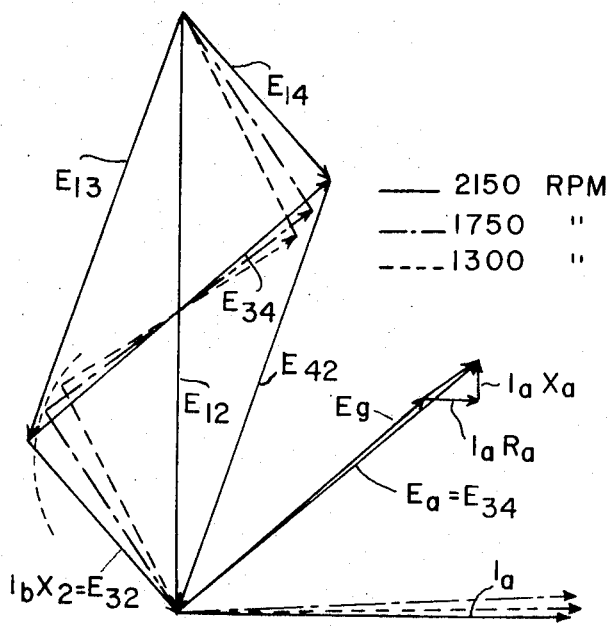

FIG. 5 is a phasor diagram that illustrates the relationships of the voltages and currents inherent to the circuit of FIG. 1. This diagram was constructed from test data on the above mentioned specially constructed motor. The relationships of the voltages are shown for a given circuit at three different operating speeds.

Referring now to FIG. 1 there is illustrated a source of single-phase alternating voltage, $E_{12}$, between the points 1 and 2. Two tuned circuits are connected as shown across this source. Each of the tuned circuits consists of a field section 5 of an electric motor each having an inductive reactance of $X_2$ ohms, and a capacitor 6 each having a capacitive reactance of $X_1$ ohms. Each pair of a capacitor 6 and reactor 5 (section of a field winding) form a resonant circuit. The magnitude of the ohmic value of $X_1$ is such that it is equal to $X_2$. It will be noted that one inductor 5 is connected to one source 1 and the other to the other source 2 so that the inductor-capacitor pairs are inverted with respect to each other. The midpoints of the two tuned circuits are designated 3 and 4 and act as terminals for the armature.

The armature circuit contains a commutated armature winding 7. While not necessary, it is advantageous to improve the power factor of the armature circuit by providing a compensating winding on the stator that has a magnetic axis which is 180 electrical degrees out-of-phase with the magnetic axis of the armature. This compensating winding can be connected in series with the armature or it can be short circuited such that it produces a demagnetizing action on the armature through transformer action between it and the armature circuit. Another method of obtaining the same characteristic would be to connect a compensating winding between the junctions 3 and 4 and provide a short circuit on the armature. With this connection the armature can be designed for low voltages and thereby attain better commutation.

Figure 3:
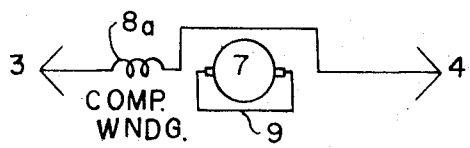
FIG. 3 is a fragmentary showing of the armature circuit corresponding to FIG. 1 showing a modified form of compensating winding.
Figure 4:
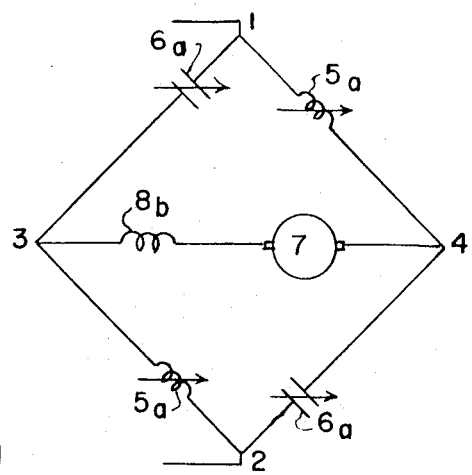
FIG. 4 is a schematic diagram corresponding to FIG. 1 wherein the inductors and capacitors are variable to adjust the circuit to a range of source frequencies, and wherein also the compensating winding is modified by placing it in series with the armature.

These three modes of improving the power factor are shown in FIGS. 1, 3 and 4. In FIG. 1 the armature 7 is connected in series between points 3 and 4 of the two turned circuits, and a stator compensating winding 8 is short circuited. In FIG. 3 a stator compensating winding 8a is connected in series between 3 and 4, and the armature 7 is short circuited by a conductor 9. In FIG. 4 the armature 7 is connected in series between 3 and 4 with a stator compensating winding 8b.

The combination of the four reactances $X_1$, $S_1$, $X_2$, $X_2$ of FIG. 1 to provide a monocyclic network that will cause a constant current $I_a$ in the armature circuit. The constancy of this current can be shown as follows: Assuming that the total current flowing from 1 to 3 to be made up of two components, $I_a$ and $I_b$, and that $I_a$ is the component that flows through the armature circuit and $I_b$ flows from the points 1 to 3 to 2, the following equations prevail, $$E_{13} = I_a X_1 + I_b X_1 \quad (1)$$
$$E_{23} = I_b X_2 \quad (2)$$
$$E_{14} = I_a X_1 + I_b X_1 + E_{34} \quad (3)$$
$$E_{42} = I_b X_2 - E_{34} \quad (4)$$

adding (3) and (4)

$$E_{12} = I_a X_1 + I_b X_1 + I_b X_2$$

but $I_b X_1 + I_b X_2 = 0$ (tuned circuit)

∴ $E_{12} = I_a X_1$ and $I_a = \dfrac{E_{12}}{X_1}$

Thus for a fixed value of $E_{12}$, $I_a$ is a constant and independent of the impedance between the points 3 and 4. Furthermore since $X_1$ is capacitive in nature $I_a$ must lead the voltage vectorially by 90 electrical degrees.

Experimental tests on the motor provided the data for the phasor diagram of FIG. 5. From this diagram the following conditions are evident.

Under running condition the sum of the voltages $E_{14}$ and $E_{32}$ on the field windings becomes less than the supply voltage $E_{12}$ and they are shifted to lead this voltage. The sum of the voltages $E_{13}$ and $E_{42}$ on the capacitors is greater than the supply voltage, and they are shifted behind this supply voltage.

With changes in armature speed, the voltage on the field windings 5 changes in magnitude and phase angle. The increase in the magnitude of the voltages on the condensers that is in the direction of $E_{12}$ is equal to the decrease in the magnitude of the voltages on the fields that is in phase with the voltage $E_{12}$. Thus increases of speed will increase the current supplied to the armature from the capacitors by the same amount as the reduction of armature current supplied from the fields. Thus the armature current is unaffected by change in speed. The phase relationship of $E_a$ and $I_a$ is such that the armature receives a lagging current. This will result in a leading load component of current at the input.

In FIG. 5 test data are represented vectorially for three different speeds when the motor is connected as in FIG. 1. Variations in r.p.m. were obtained by varying the load. It is evident that for each speed the vector $I_bX_2$ appears to be 90 electrical degrees out-of-phase with the $E_a$ (actually this angle is slightly more than 90°). This indicates that the field flux produced by the field windings 5 with their reactances $X_2$ and $X_2$ is essentially 90 electrical degrees out-of-phase with the voltage $I_bX_2$ and therefore the speed voltage in the armature $E_a$ (which is in time phase with the field flux) will assume a position which is perpendicular to $I_bX_2$.

The torque produced by the motor results from the interaction of $I_a$ and a component of the airgap flux that is in time phase with $I_a$ and this flux is produced by currents in the field windings 5. This particular flux is a component of the total flux created by the field windings and is associated with a high component of $I_bX_2$ that is in time phase with $E_{12}$. Thus for high speeds, $I_bX_2$ reduces in magnitude. It changes in direction or angle as speed changes, and it is essentially at right angles to the armature voltage $E_a$. The triangle formed by the lines $E_{12}/2$ and $E_a/2$ and $I_bX2$ will be a right triangle with $E_{12}/2$ as a hypotenuse. The extremity of the vector $I_bX_2$ will follow the path of a circle, the diameter of which is one-half of $E_{12}$. As the vectors, $I_bX_2$, for various r.p.m. take their various positions, the flux produced by the inductances 5 (field windings) that is in the direction of $I_a$, must change and this will cause a change in the torque as the speed increases as is indicated by any one curve in FIG. 2.

Figure 2:
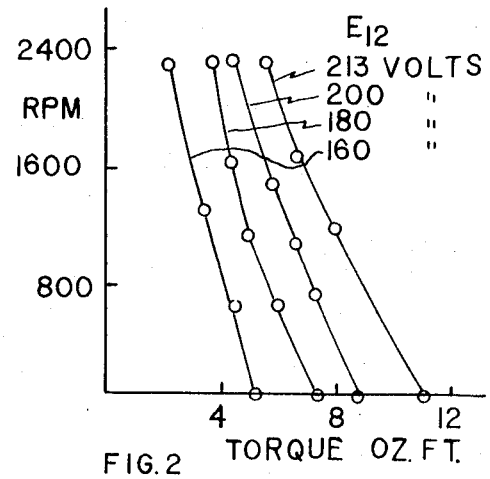
FIG. 2 is a graph of the speed-torque characteristics of the machine thus connected. These characteristics were obtained from experimental data on specially constructed model with an approximate rating of one-third horsepower at maximum torque and maximum speed.

The effect of change in speed is illustrated in the graph of FIG. 2. The different curves were produced by the different indicated source voltages and the changes in r.p.m. by adjusting the load. Load tests revealed, as expected, that the torque was not constant for all speeds. However the variations in torque for one value of applied voltage will undoubtedly be acceptable for many applications and may even be preferable to constant-torque characteristics. The torque can be adjusted by changing the magnitude of the applied voltage. The variation of torque at different operating speeds is inherent in the illustrated circuits because the motor field windings are used as the inductive reactances of the tuned circuit.

Referring to FIG. 4 there is illustrated a tuned circuit network that is similar in arrangement to FIG. 1 but wherein the capacitors and inductors (field winding sections) are variable. The variation of the inductances of windings 5a can be achieved by adjustable taps on the windings 5a that provide for a greater or fewer number of field winding turns between 1 and 4, 3 and 2. The network of the tuned circuits of any of the FIGS. operates efficiently at only one source frequency, and as a consequence may properly be described as a monocyclic network or one that responds only a fixed cycle or frequency. This is acceptable in most industrial applications because of the almost universal use of 60 cycle electric power. If, however, a power source is used that varies in frequency or if is desired to use one system with a variety of power sources of different frequencies then the variable tuned circuits of FIG. 4 may be used. In FIG. 4, variable capacitors 6a and variable inductors 5a (field winding sections) are used to accommodate different source frequencies. The inductors and capacitors may be varied automatically as frequency changes or can be set for a selected frequency.

It will be appreciated by those skilled in the art that the principle expounded here can be incorporated in a large number of systems involved with different methods of armature circuit connections, field winding designs and tuned circuits. There is illustrated only presently embodiments as required by the rules. Further experiments employing the cited principles would result in future preferred forms for specific applications. The embodiments described are therefore illustrative only and are not intended to be limiting or definitive of the invention.

I claim:

1. A system including a single-phase motor having a stator and a rotor that provides a wide range of speeds with only slight changes in torque and which receives energy from two terminals of a single-phase alternating source of selected frequency comprising:
   a. a tuned network circuit including two parallel paths connected across said source, each path comprising a condenser and a section of field winding on the stator of the motor wherein one field section is connected to one terminal of the single phase source, and the other field section is connected to the other terminal of the source, and the junctions of the condenser and field section of each path serve as armature terminals;
   b. an armature circuit connected to the armature terminals an including a commutated armature winding adapted to rotate within said stator;

said circuits being connected across the voltage source such that one terminal of each of the field sections is connected to each of the supply lines and that the polarities of the field winding are such as to produce fluxes across an airgap between the rotor and the stator that are additive, said field windings being located on the stator so that their magnetic axis is 90 electrical degrees out-of-phase with the magnetic axis of the armature winding, resulting in the armature receiving a current that is essentially 90 electrical degrees out-of-phase with the source voltage, said current acting on a component of the total flux created by the field sections to produce a motor torque in a given direction for all speeds both positive and negative including conditions of standstill.

2. A motor system as set forth in claim 1 wherein the armature circuit includes a compensating winding to minimize the reactive voltage of the armature winding, said compensating winding being located on the stator element surrounding said armature and positioned so that its magnetic axis is 180 electrical degrees out-of-phase in space with the flux produced by the armature winding 3. A motor system as set forth in claim 2 wherein the compensating winding is short circuited, wherein the compensating action results from a short circuit flowing in the compensating winding that is produced by transformer action between the armature and the short circuited winding.

4. A motor system as set forth in claim 2 wherein the compensating winding is connected between the armature circuit terminals and the armature is short circuited and receives its current by transformer action from the compensating winding.

5. A motor system as set forth in claim 2 wherein the compensating winding and armature are connected in series and positioned such that their magnetic axes are 180 electrical degrees out of space phase.

6. A motor system as set forth in claim 1 wherein the source has a plurality of frequencies and the inductors and capacitors are variable to tune the tuned circuit to the frequency of the source.

7. A motor system as set forth in claim 6 wherein the capacitors and inductors are automatically variable to adjust to the source frequency.